(12) United States Patent
Uhm et al.

(10) Patent No.: US 10,439,208 B2
(45) Date of Patent: Oct. 8, 2019

(54) NEGATIVE ELECTRODE ACTIVE MATERIAL FOR SECONDARY BATTERIES HAVING IMPROVED LIFESPAN CHARACTERISTICS

(71) Applicant: LG Chem, Ltd., Seoul (KR)

(72) Inventors: In Sung Uhm, Daejeon (KR); Jungwoo Yoo, Daejeon (KR); Je Young Kim, Daejeon (KR); Hoe Jin Hah, Daejeon (KR); Ji Yoon Kwon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/892,872

(22) PCT Filed: Jul. 24, 2014

(86) PCT No.: PCT/KR2014/006749
§ 371 (c)(1),
(2) Date: Nov. 20, 2015

(87) PCT Pub. No.: WO2015/016531
PCT Pub. Date: Feb. 5, 2015

(65) Prior Publication Data
US 2016/0233489 A1 Aug. 11, 2016

(30) Foreign Application Priority Data

Jul. 31, 2013 (KR) .......................... 10-2013-0091244

(51) Int. Cl.
*H01M 4/36* (2006.01)
*H01M 4/505* (2010.01)
*H01M 10/0525* (2010.01)
*H01M 10/052* (2010.01)
*H01M 4/38* (2006.01)
*H01M 4/587* (2010.01)
*H01M 4/13* (2010.01)
*H01M 4/02* (2006.01)

(52) U.S. Cl.
CPC ............ *H01M 4/366* (2013.01); *H01M 4/13* (2013.01); *H01M 4/386* (2013.01); *H01M 4/505* (2013.01); *H01M 4/587* (2013.01); *H01M 10/052* (2013.01); *H01M 10/0525* (2013.01); *H01M 2004/021* (2013.01); *H01M 2004/027* (2013.01); *H01M 2220/20* (2013.01); *Y02E 60/122* (2013.01)

(58) Field of Classification Search
CPC combination set(s) only.
See application file for complete search history.

(56) References Cited

U.S. PATENT DOCUMENTS

| | | | |
|---|---|---|---|
| 2005/0136330 A1* | 6/2005 | Mao | C25D 17/10 429/231.95 |
| 2008/0145757 A1* | 6/2008 | Mah | H01M 4/133 429/219 |
| 2010/0136432 A1 | 6/2010 | Kim | |
| 2010/0273058 A1* | 10/2010 | Lee | H01M 4/133 429/225 |
| 2011/0278506 A1 | 11/2011 | Toyokawa | |
| 2012/0082877 A1* | 4/2012 | Song | H01M 4/1315 429/94 |
| 2012/0100401 A1* | 4/2012 | Yasui | H01M 2/105 429/7 |
| 2012/0115033 A1 | 5/2012 | Kim et al. | |
| 2013/0004846 A1* | 1/2013 | Kim | B82Y 30/00 429/213 |
| 2013/0040203 A1* | 2/2013 | Yoon | H01M 4/1393 429/231.8 |
| 2013/0065109 A1* | 3/2013 | Amagai | H01M 2/0212 429/162 |
| 2013/0078490 A1 | 3/2013 | Morita et al. | |
| 2013/0089784 A1 | 4/2013 | Cho et al. | |
| 2013/0130115 A1 | 5/2013 | Park et al. | |
| 2013/0136988 A1* | 5/2013 | Tanaka | H01M 4/133 429/220 |
| 2013/0266870 A1* | 10/2013 | Chang | H01M 4/366 429/231.8 |
| 2013/0337334 A1 | 12/2013 | Tao et al. | |
| 2014/0234710 A1* | 8/2014 | Lee | H01M 4/366 429/219 |
| 2014/0342222 A1* | 11/2014 | Kim | H01M 4/366 429/213 |

FOREIGN PATENT DOCUMENTS

| | | | |
|---|---|---|---|
| CN | 102468483 | A | 5/2012 |
| CN | 103137953 | A | 6/2013 |
| JP | 2006228640 | A | 8/2006 |
| JP | 2010129545 | A | 6/2010 |
| JP | 2010262754 | A | 11/2010 |
| JP | 2012099452 | A | 5/2012 |
| JP | 2013073764 | A | 4/2013 |
| JP | 2013110112 | A | 6/2013 |
| KR | 100752058 | B1 | 8/2007 |
| KR | 20110100290 | A | 9/2011 |
| KR | 20130004536 | A | 1/2013 |
| KR | 20130016727 | A | 2/2013 |
| KR | 20130037090 | A | 4/2013 |
| KR | 20130037150 | A | 4/2013 |
| KR | 20130071070 | A | 6/2013 |
| WO | 2012086940 | A2 | 6/2012 |
| WO | 2012113606 | A1 | 8/2012 |
| WO | WO2011084817 | * | 2/2013 |

OTHER PUBLICATIONS

International Search Report for Application No. PCT/KR2014/006749 dated Nov. 3, 2014.

* cited by examiner

*Primary Examiner* — Christopher P Domone
(74) *Attorney, Agent, or Firm* — Lerner, David, Littenberg, Krumholz & Mentlik, LLP

(57) ABSTRACT

Disclosed is a negative electrode active material for secondary batteries having improved lifespan characteristics. In particular, provided is a negative electrode active material, for secondary batteries, including silicon (Si), and amorphous hard carbon or low-crystalline soft carbon.

18 Claims, No Drawings

NEGATIVE ELECTRODE ACTIVE MATERIAL FOR SECONDARY BATTERIES HAVING IMPROVED LIFESPAN CHARACTERISTICS

CROSS REFERENCE TO RELATED APPLICATIONS

The present application is a national phase entry under 35 U.S.C. § 371 of International Application No. PCT/KR2014/006749, filed Jul. 24, 2014, published in Korean, which claims the benefit of Korean Patent Application No. 10-2013-0091244, filed Jul. 31, 2013. The disclosures of said applications are incorporated by reference herein.

TECHNICAL FIELD

The present invention relates to a negative electrode active material for secondary batteries having improved lifespan characteristics and a secondary battery including the same.

BACKGROUND ART

As mobile device technology continues to develop and demand therefore continues to increase, demand for secondary batteries as energy sources is rapidly increasing. Among these secondary batteries, lithium secondary batteries which have high energy density and voltage and exhibit long lifespan and low self-discharge rate are commercially available and widely used.

In particular, lithium secondary batteries used in electric vehicles etc. require high energy density, high short-term power output, and use for 10 years or longer under harsh conditions in which charge and discharge are rapidly repeated under high current and thus need to have excellent output characteristics and longer lifespan than existing small lithium secondary batteries.

As a negative electrode active material for lithium ion secondary batteries used in conventional small devices, a graphite based material among carbon based compounds that reversibly receive or supply lithium ions while generally maintaining structural and electrical properties, and that have characteristics such as a chemical potential almost similar to metallic lithium upon intercalation and deintercalation of lithium ions is mainly used.

However, a theoretical maximum capacity of a negative electrode including a negative electrode active material composed of such a graphite based material is 372 mAh/g (844 mAh/cc), and thus, capacity increase is limited. Accordingly, it is difficult to perform sufficient function as an energy source of fast changing next-generation mobile phones. Furthermore, since high rate discharge characteristics of a graphite based material are not superior, it is limited to apply the graphite based material to a power source that should rapidly supply high electricity, such as electric vehicles, hybrid electric vehicles, electrically-drive tools, etc.

In addition, since lithium metal considered as a negative electrode active material has very high energy density, high capacity may be realized. However, there are problems such as a stability problem due to dendrite growth upon repeated charge and discharge, and short cycle lifespan. In addition, use of carbon nanotubes as a negative electrode active material was tried, but problems such as low productivity, high costs, low initial efficiency of 50% or less were pointed out.

It was known that, as another negative electrode active material, silicon, tin or alloy thereof may reversibly occlude and release a large amount of lithium through reaction that forms a compound with lithium, and much research thereinto is underway.

Since, silicon, for example, has a theoretical maximum capacity of approximately 4020 mAh/g (9800 mAh/cc, specific gravity: 2.23) that is much larger than graphite based materials, silicone is a superior candidate as a high-capacity negative electrode material. However, the negative electrode material has disadvantages such as very large volume change during charge and discharge, and non-superior high-rate discharge characteristics.

In addition, when a battery is composed of an active material prepared by mixing the different material types, charging current is considered into one material during charge and discharge of the battery due to voltage difference between the different materials, which deteriorates lifespan characteristics of the battery.

Accordingly, there is an urgent need for a negative electrode active material that exhibits predetermined capacity, high discharge characteristics and lifespan characteristics.

In this regard, first, a negative electrode material formed by coating a crystalline carbon based compound with an amorphous carbon layer may be considered. However, in this case, energy density is improved, but it is difficult to anticipate high output due to a low ratio of an amorphous carbon based compound included in a negative electrode material. In addition, it is impossible to obtain lifespan characteristics of a desired level due to poor electrical conductivity of a coating layer.

In another embodiment, a negative electrode material coated with a crystalline coating layer by coating non-graphitizable particle surfaces with a graphitizable material among amorphous carbon based compounds and by firing the coated particles up to graphitizable temperature may be considered. That is, by crystallizing graphitizable materials of particle surfaces through high-temperature treatment, a negative electrode material exhibiting high electrical conductivity may be considered. However, in order to obtain a coating layer having electrical conductivity of a sufficient level, firing should be performed to considerably high temperature (2800° C. or more). In this process, considerable portions of non-graphitizable particles, as a core, may also be crystallized.

Therefore, there is an urgent need for technology to resolve such problems.

DISCLOSURE

Technical Problem

A Therefore, the present invention has been made to solve the above and other technical problems that have yet to be resolved.

As a result of a variety of extensive and intensive studies and experiments, the inventors of the present invention developed a negative electrode active material which may exhibit a predetermined capacity, and superior discharge characteristics and lifespan characteristics, as described below, thus completing the present invention.

Technical Solution

In accordance with one aspect of the present invention, provided is a negative electrode active material for secondary batteries, the negative electrode active material including silicon (Si), and amorphous hard carbon or low-crystalline soft carbon.

In a specific embodiment, the negative electrode active material may include 2 wt % to 40 wt % of silicon, and 60 wt % to 98 wt % of amorphous hard carbon, or 60 wt % to 98 wt % of low-crystalline soft carbon.

The inventors of the present application confirmed that, when the negative electrode active material includes silicon (Si), amorphous hard carbon, or low-crystalline soft carbon having a similar charge profile as described above in a predetermined range, the different material types feel the same C-rate during charging of a battery including the negative electrode active material, whereby lifespan characteristics of a secondary battery including the negative electrode active material may be effectively enhanced.

The amorphous hard carbon or the low-crystalline soft carbon included the negative electrode active material for secondary batteries may have a capacity of 350 mAh/g to 500 mAh/g.

In the negative electrode active material according to the present invention, the silicon may be dispersed on surfaces of the amorphous hard carbon or the low-crystalline soft carbon.

In a specific embodiment, the silicon may be dispersed on a surface of the amorphous hard carbon or the low-crystalline soft carbon by mixing a mixture, which includes a viscoelastic polymer, with the amorphous hard carbon or the low-crystalline soft carbon, and by thermally treating the same. In this case, the negative electrode active material may be thermally treated at 800° C. to 1200° C.

In a specific embodiment, the silicon is a nanoparticle type, and the size of the silicon nanoparticles may be 5 nanometers to 30 nanometers.

Meanwhile, the silicon may have a nanowire shape. In this case, the diameter of the silicon nanowire may be 10 nanometers to 500 nanometers, and the length of the silicon nanowire may be 20 nanometers to 1000 nanometers.

In addition, the silicon nanowire may be dispersed to a spiral structure on a surface of the amorphous hard carbon or the low-crystalline soft carbon.

In a specific embodiment, the amorphous hard carbon or low-crystalline soft carbon may be formed from a carbon precursor including at least one selected from the group consisting of sucrose, methylene diphenyl diisocyanate, poly urethane, phenol resin, naphthalene resin, polyvinyl alcohol, polyvinylchloride, furfuryl alcohol, polyacrylonitrile, polyamide, furan resin, cellulose, styrene, polyimide, epoxy resin, vinyl chloride resin, coal tar pitch, petroleum based pitch, mesophase pitch, tar and low-molecular-weight heavy oil, but the present invention is not limited thereto. The present invention provides a negative electrode including the negative electrode active material. The negative electrode may have an energy density of 1.0 mAh/cm$^2$ to 9.0 mAh/cm$^2$.

The present invention also provides a secondary battery in which an electrode assembly, which includes the negative electrode, a positive electrode and a separator disposed between the negative electrode and the positive electrode, is impregnated with an electrolyte solution. The positive electrode may include a lithium transition metal oxide represented by Formula 1 or 2 below as a positive electrode active material.

$$Li_xM_yMn_{2-y}O_{4-z}A_z \qquad (1),$$

Wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \le x \le 1.2$, $0 < y < 2$, and $0 \le z < 0.2$.

$$(1-x)LiM'O_{2-y}A_{y}-xLi_2MnO_{3-y'}A_{y'} \qquad (2)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0 < x < 1$, $0 < y \le 0.02$, $0 < y' \le 0.02$, $0.5 \le a \le 1.0$, $0 \le b \le 0.5$, and $a+b=1$.

In general, the positive electrode is prepared by drying after coating a mixture of a positive electrode active material, a conductive material and a binder, as an electrode mixture, on a positive electrode current collector. In this case, as desired, the mixture may further include a filler.

The positive electrode active material may include, other than a lithium transition metal oxide represented by Formula 1 or 2 below, layered compounds such as lithium cobalt oxide ($LiCoO_2$) and lithium nickel oxide ($LiNiO_2$) or compounds substituted with one or more transition metals; lithium manganese oxides represented by $Li_{i+x}Mn_{2-x}O_4$ where $0 \le x \le 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{i-x}M_xO_2$ where M=Co, Mn, Al, Cu, Fe, Mg, B, or Ga, and $0.01 \le x \le 0.3$; lithium manganese composite oxides having the formula $LiMn_{2-x}M_xO_2$ where M=Co, Ni, Fe, Cr, Zn, or Ta, and $0.01 \le x \le 0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

Meanwhile, the graphite based material having elasticity may be used as the conductive material and may be used with the other materials.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The present invention also provides a secondary battery including the electrode, and the secondary battery may be a lithium ion battery, a lithium ion polymer battery, or a lithium polymer battery.

Lithium secondary batteries are generally composed of a positive electrode, a negative electrode, a separator disposed between the positive electrode and the negative electrode, and a lithium salt-containing non-aqueous electrolyte. Other components of lithium secondary batteries are described below.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me:Mn, Fe, Pb, or Ge; Me':Al, B, P, Si, Group I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$ The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

Meanwhile, the secondary battery may be a lithium ion battery, a lithium ion polymer battery or a lithium polymer battery, but the present invention is not limited thereto.

The present invention provides a battery module including the secondary battery as a unit cell, a battery pack including the battery module, and a device including the battery pack as a power source.

In this case, particular examples of the device include electric vehicles, hybrid electric vehicles, plug-in hybrid electric vehicles or systems for storing power, but the present invention is not limited thereto.

MODE FOR INVENTION

Now, the present invention will be described in more detail with reference to the accompanying drawings. These examples are provided for illustrative purposes only and should not be construed as limiting the scope and spirit of the present invention.

EXAMPLE 1

SiO having a capacity of 1400 mAh/g and pitch having a carbonization yield of 50% as a viscoelastic polymer were mixed in a ratio of 95:5. The resultant mixture was mixed with amorphous hard carbon having a capacity of 357 mAh/g in a ratio of 20.6:79.4, and thermally treated using a batch furnace for one hour at 1200, thereby preparing a negative electrode active material.

EXAMPLE 2

A negative electrode active material was prepared in the same manner as in Example, except that, in the process of preparing the negative electrode active material, a mix ratio of the mixture including SiO and pitch to the amorphous hard carbon was 33:67.

COMPARATIVE EXAMPLE 1

A negative electrode active material was prepared in the same manner as in Example, except that, in the processes of preparing the negative electrode active material, the mixture including SiO and pitch, and graphite having a capacity of 363 mAh/g were mixed in a ratio of 20.6:79.4.

COMPARATIVE EXAMPLE 2

A negative electrode active material was prepared in the same manner as in Example, except that, in the processes of preparing the negative electrode active material, the mixture including SiO and pitch, and graphite having a capacity of 363 mAh/g were mixed in a ratio of 33:67.

EXPERIMENTAL EXAMPLE 1

A negative electrode mixture slurry including each of Examples 1 and 2 and Comparative Examples 1 and 2 was coated on copper (Cu) foil having a thickness of 10 μm to prepare a negative electrode. Celgard™ as a separator was used. After manufacturing an electrode assembly including the negative electrode, an electrolyte solution including 1 M $LiPF_6$ was added to a mixed solvent including cyclic and linear carbonate, thereby manufacturing a battery. Charge and discharge characteristics of the battery were evaluated. In particular, after CC mode-charging up to 5 mV at a current density of 0.1 C during charge, charging was completed when a current density was 0.01 C while constantly maintaining 5 mV at a CV mode. Discharge was completed by discharging up to 1.5 V at a CC mode at a current density of 0.1 C, thereby obtaining charge and discharge capacity and efficiency at a first cycle. Subsequently, charge and discharge were repeated 50 times under a condition in which only a current density was changed to 0.5 C, and remaining conditions were the same as those described above, and capacity maintenance ratios were measured. Results are summarized in Table 1.

TABLE 1

|  | Example 1 | Example 2 | Comparative Example 1 | Comparative Example 2 |
|---|---|---|---|---|
| Charge capacity (mAh/g) | 625.5 | 807.0 | 626.1 | 809.0 |
| Discharge capacity (mAh/g) | 571.45 | 700.84 | 572.1 | 702.60 |
| Efficiency (%) | 91.35 | 86.84 | 91.37 | 86.84 |
| Capacity maintenance ratio after charging and discharging 50 times (%) | 88% | 75% | 79% | 62% |

As shown in Table 1, it can be confirmed that, when the negative electrode active materials including SiO and the amorphous hard carbon within the predetermined range as in Examples 1 and 2 of the present invention were used, superior lifespan characteristics are exhibited, compared with the negative electrode active materials according to Comparative Examples 1 and 2 in which silicon and graphite were mixed after charging and discharging 50 times.

This occurs since, whereas SiO and amorphous hard carbon, in Example 1 and 2, simultaneously charge and discharge Li at a constant voltage during charge and discharge due to a charge and discharge potential of the amorphous hard carbon similar to SiO, a charge and discharge potential between SiO and graphite is different in Comparative Examples 1 and 2 in which SiO and graphite were mixed, and thus, participation sections of SiO and graphite during charge and discharge were different, whereby performance of a battery cell deteriorated by rate burden.

In Examples 1 and 2, when the low-crystalline soft carbon, other than the amorphous hard carbon, was used, the similar results were exhibited.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a negative electrode active material for secondary batteries according to the present invention includes silicon (Si), amorphous hard carbon, and low-crystalline soft carbon which have a similar charge profile range within a predetermined range. Accordingly, the different material types feel the same C-rate during charging a battery, whereby lifespan characteristics of a secondary battery may be enhanced.

The invention claimed is:

1. A negative electrode active material for secondary batteries, the negative electrode active material consisting of silicon (Si), and low-crystalline soft carbon,
wherein the silicon is dispersed on surfaces of the low-crystalline soft carbon,
wherein the low-crystalline soft carbon is formed from a carbon precursor comprising at least one selected from the group consisting of sucrose, methylene diphenyl diisocyanate, polyurethane, polyvinyl alcohol, polyvinylchloride, furfuryl alcohol, polyacrylonitrile, polyamide, furan resin, cellulose, styrene, polyimide, epoxy resin, vinyl chloride resin, coal tar pitch, petroleum based pitch, mesophase pitch, and tar, and
wherein the negative electrode active material consists of 2 wt% to 40 wt% of silicon, and 60 wt% to 98 wt% of low-crystalline soft carbon.

2. The negative electrode active material according to claim 1, wherein the low-crystalline soft carbon has a capacity of 350 mAh/g to 500 mAh/g.

3. The negative electrode active material according to claim 1, wherein the silicon is dispersed on a surface of the low-crystalline soft carbon by mixing a mixture, which comprises a viscoelastic polymer, with the low-crystalline soft carbon, and by thermally treating the same.

4. The negative electrode active material according to claim 3, wherein the negative electrode active material is thermally treated at 800 ° C. to 1200 ° C.

5. The negative electrode active material according to claim 1, wherein the silicon is a nanoparticle type.

6. The negative electrode active material according to claim 5, wherein a size of the silicon nanoparticles is 5 nanometers to 30 nanometers.

7. The negative electrode active material according to claim 1, wherein the silicon has a nanowire shape.

8. The negative electrode active material according to claim 7, wherein a diameter of the silicon nanowire is 10 nanometers to 500 nanometers, and a length of the silicon nanowire is 20 nanometers to 1000 nanometers.

9. The negative electrode active material according to claim 7, wherein the silicon nanowire is dispersed to a spiral structure on a surface of the low-crystalline soft carbon.

10. A negative electrode comprising the negative electrode active material according to claim 1.

11. The negative electrode according to claim 10, wherein the negative electrode has an energy density of 1.0 mAh/cm$^2$ to 9.0 mAh/cm$^2$.

12. A secondary battery according to claim 10, wherein an electrode assembly, which comprises the negative electrode according to claim 10, a positive electrode and a separator disposed between the negative electrode and the positive electrode, is impregnated with an electrolyte solution.

13. The secondary battery according to claim 12, wherein the positive electrode comprises a lithium transition metal oxide represented by Formula 1 or 2 below as a positive electrode active material:

$$Li_xM_yMn_{2-y}O_{4-z}A_z \quad (1),$$

wherein M is at least one element selected from the group consisting of Al, Mg, Ni, Co, Fe, Cr, V, Cu, B, Ca, Zn, Zr, Nb, Mo, Sr, Sb, W, Ti and Bi; and
A is at least one monovalent or divalent anion; 0.9≤x ≤1.2, 0≤y<2, and 0 ≤z<0.2, $$(1-x)LiM'O_{2-y}A_{y'} \cdot xLi_2MnO_{3-3}\cdot A_{y'} \quad (2),$$

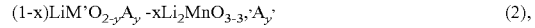

wherein M' is $Mn_aM_b$;
M is at least one selected from the group consisting of Ni, Ti, Co, Al, Cu, Fe, Mg, B, Cr, Zr, Zn and Period II transition metals;
A is at least one selected from the group consisting of anions such as PO$_4$, BO$_3$, CO$_3$, F and NO$_3$; and
0<x<1, 0<y ≤0.02, 0<y'≤0.02, 0.5 ≤a ≤1.0, 0 ≤b ≤0.5, and a+b=1.

14. The secondary battery according to claim 12, wherein the secondary battery is a lithium ion battery, a lithium ion polymer battery or a lithium polymer battery.

15. A battery module comprising the secondary battery according to claim 12 as a unit cell.

16. A battery pack comprising the battery module according to claim 15.

17. A device comprising the battery pack according to claim 16 as a power source.

18. The device according to claim 17, wherein the device is an electric vehicle, a hybrid electric vehicle, a plug-in hybrid electric vehicle or a system for storing power.

* * * * *